United States Patent [19]
Saida et al.

[11] Patent Number: 5,699,851
[45] Date of Patent: Dec. 23, 1997

[54] AIR CONDITIONER FOR VEHICLES

[75] Inventors: Kazunori Saida, Kariya; Hiroyuki Yamaguchi, Aichi-gun, both of Japan

[73] Assignee: Nippondenso Co., Ltd., Kariya, Japan

[21] Appl. No.: 633,082

[22] Filed: Apr. 16, 1996

[30] Foreign Application Priority Data

Apr. 18, 1995 [JP] Japan ................... 7-092806

[51] Int. Cl.$^6$ ................... F25B 29/00
[52] U.S. Cl. ................... 165/42; 165/43; 165/103; 454/121; 454/126; 454/156; 454/69; 237/12.3 A; 237/12.3 B; 251/175; 251/901
[58] Field of Search ................... 165/41, 42, 43, 165/103; 454/121, 126, 156, 69; 237/12.3 A, 12.3 B; 251/175, 901; 62/244

[56] References Cited

U.S. PATENT DOCUMENTS

| | | | |
|---|---|---|---|
| 2,101,991 | 12/1937 | Finley et al. | 251/175 |
| 3,381,706 | 5/1968 | Hendey | 251/901 |
| 4,084,616 | 4/1978 | Tragert | 251/901 |
| 4,164,211 | 8/1979 | Onnen | 251/175 |
| 4,546,617 | 10/1985 | Suzuki et al. | 165/43 |
| 4,604,873 | 8/1986 | Ohashi et al. | 62/244 |
| 5,062,473 | 11/1991 | Ostrand et al. | 165/43 |
| 5,105,730 | 4/1992 | Smith | 251/901 |
| 5,162,020 | 11/1992 | Asano et al. | 165/103 |
| 5,551,667 | 9/1996 | Galka et al. | 454/69 |

FOREIGN PATENT DOCUMENTS

| | | |
|---|---|---|
| 1-172014 | 7/1989 | Japan. |
| 2-15508 | 1/1990 | Japan. |
| 6-71222 | 10/1994 | Japan. |

OTHER PUBLICATIONS

United States Patent Application 08/620,582, filed Mar. 22, 1996.
United States Patent Application 08/620,609, filed Mar. 22, 1996.
United States Patent Application 08/624,837, filed Mar. 22, 1996.

*Primary Examiner*—John K. Ford
*Attorney, Agent, or Firm*—Cushman, Darby & Cushman IP Group of Pillsbury, Madison & Sutro LLP

[57] ABSTRACT

According to the present invention, a sliding door is positioned between the cooler and the heater and slidable in a direction crossing both the cool air passage and the warm air to control each amount of air flowing to the warm air passage and air flowing to the cool air passage, and the sliding door slides vertically in such a manner that an upper portion of the sliding door inclines toward the cooler. Since the sliding door slides itself in the vertical direction, with the upper portion of the sliding door inclined to the cooler, condensed water, which is likely to move with the blown air from the cooling unit to the air downstream side, can be smoothly guided downwardly with the air flow along the inclination of the sliding door, thus preventing the stench caused by mold and corrosion of the heater.

8 Claims, 8 Drawing Sheets

AIR CONDITIONER FOR VEHICLES

CROSS REFERENCE TO RELATED APPLICATION

The present application is based upon and claims the benefit of priority from Japanese Patent Application No. 7-92806, filed on Apr. 18, 1995, the content of which is incorporated herein by reference.

BACKGROUND OF THE INVENTION

1. Field of the Invention

The present invention relates to an air conditioner for a vehicle which adjusts the air flow ratio of the air toward a heater core and the air toward a cool air passage by means of a sliding door sliding in the direction crossing both an air passage to the heater core and the cool air passage.

2. Description of Related Art

Conventionally, an air conditioner for a vehicle having this kind of the sliding door is disclosed in the Japanese Patent Laid-Open publication No. Hei 1-172014. The conventional air conditioner includes the sliding door disposed between a cooling unit (evaporator) and a heating unit (heater core) which is provided at air downstream side, so as to slide the sliding door operated by the transmission of an electrical motor or the like via a link mechanism.

Since the sliding door slides in the direction crossing both an air passage to the heater and the cool air passage, the sliding door has an advantage that the space for installing the sliding door can be greatly reduced compared with a conventional rotary door. However, accompanied by the reduction in the space for installation, condensed water having been produced at the cooling unit sticks to the sliding door and the heater unit without dropping down, because a gap between the cooling unit (evaporator) and the heating unit (heater core) is decreased.

The adhesion of the condensed water results in a stench caused by mold and corrosion of the heating unit.

SUMMARY OF THE INVENTION

In view of the above problem, it is therefore an object of the present invention to improve the drainage of the condensed water in an air conditioning unit having a sliding door.

According to the present invention, a sliding door is positioned between the cooler and the heater and slidable in a direction crossing both the cool air passage and the warm air to control each amount of air flowing to the warm air passage and air flowing to the cool air passage, and the sliding door slides vertically in such a manner that an upper portion of the sliding door inclines toward the cooler.

In an air conditioner for a vehicle having a sliding door so as to form a small clearance between the cooler unit and the heating unit, since the sliding door slides itself in the vertical direction, with the upper portion of the sliding door inclined to the cooler, condensed water, which is likely to move with the blown air from the cooling unit to the air downstream side, can be smoothly guided downwardly with the air flow along the inclination of the sliding door.

When a discharge opening is provided at a lower portion of the case and an inclined surface is provided at a bottom surface under the sliding door so as to incline toward the discharge opening, the condensed water dropping along with the inclination of the sliding door to the bottom portion of the sliding door is smoothly guided by the inclined plane provided at the bottom of the case and drained through the discharge opening to the outside.

BRIEF DESCRIPTION OF THE DRAWINGS

The above objects, features, aspects and advantages of the present invention will become understood with respect to the following detailed description, appended claims and accompanying drawing in which like reference numerals represent similar parts throughout the several view, and wherein:

DETAILED DESCRIPTION OF THE PREFERRED EMBODIMENTS

Several embodiments of the present invention will hereinafter be described with respect to the accompanying drawings.

Figure 1:
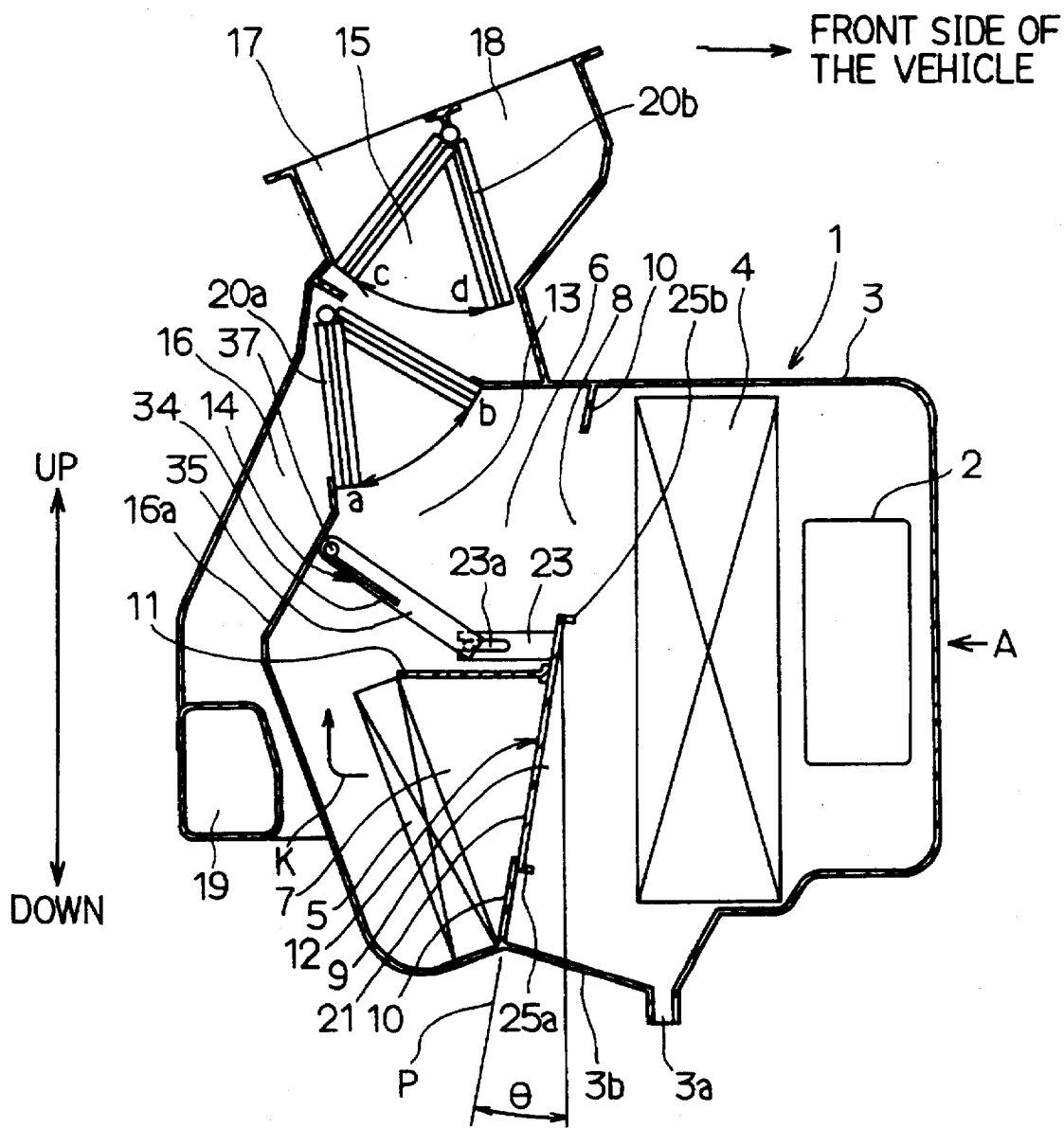
FIG. 1 is a cross-sectional view illustrating a general construction of a first embodiment of the present invention in a maximum cool mode.

A first embodiment of the present invention is described with reference to the drawings. In FIG. 1, an air conditioning unit 1 of an air conditioner for a motor vehicle disposed at a lower portion of an instrument panel in a passenger compartment. Air conditioning unit 1 includes an air inlet opening 2 for intaking air from a blower unit (not shown in the drawings) disposed below the instrument panel in a passenger compartment and in front of the seat next to the driver's seat.

The blower unit, as widely known, includes an inside/outside air selecting box for selectively introducing between the air inside of the vehicle (inside air) and the air outside of the vehicle (outside air), and a centrifugal multi-vane blower.

A resin case 3 of air conditioning unit 1 is disposed below the instrument panel at a substantially central position in the lateral direction of the passenger compartment. An evaporator 4 as air cooling means is provided at an upstream position in the airflow direction in case 3, and a heater core 5 as air heating means is provided in a lower position on a downstream side in the airflow direction. In addition, a cool air passage 6 for allowing the air cooled by evaporator 4 to bypass heater core 5 is provided in case 3 in an upper position on a downstream side of evaporator 4 (in a position above heater core 5).

Evaporator 4 is a cooler forming a refrigerating cycle in combination with an compressor, a condenser, a receiver and a pressure reducer (not all shown in figures) and dehumidifies and cools the air in case 3. The compressor is driven by an automotive engine via an electromagnetic clutch (not shown in figures). Heater core 5 is a heating unit using cool water of the vehicle engine as a heat source for reheating cool air cooled by the above-mentioned evaporator 4.

At the air downstream side of evaporator 4 in case 3, there are formed an opening 8 for cool air at the inlet of cool air passage 6 and an opening 9 for heating at the inlet of a passage 7 for heating leading to heater core 5, for introducing the cool air having passed through evaporator 4.

Both opening 8 for cool air and opening 9 for heating are open at the same plane "P" as shown in FIG. 1, and these openings 8 and 9 are defined by a projection wall 10 projecting from an inside wall of case 3 and a partition 11 provided substantially central position in case 3.

As viewed in the direction of an arrow A in FIG. 1, opening 8 for cool air and opening 9 for heating are in a substantially rectangular configuration when opening, and these openings 8 and 9 are vertically juxtaposed.

Partition 11, horizontally extends from the middle portion between the two openings 8 and 9 in the air downstream direction, so as to partition cool air passage 6 and passage 7 for heating from each other. For this reason, the air introduced from opening 9 for heating to passage 7 for heating is wholly sent to heater core 5. On the other hand, the air introduced from opening 8 for cool air to cool air passage 6 wholly bypasses heater core 5.

At an air downstream side of evaporator 4 and an air upstream side of opening 8 for cool air and opening 9 for heating, a sliding door 12 is provided for adjusting the amount of the air having passed through evaporator 4 sent to cool air passage 6 and passage 7 for heating properly. The details of sliding door 12 will be described later.

At an air downstream of cool air passage 6 and passage 7 for heating, there is provided an air mixing chamber 13 (a cool air/warm air mixing chamber) for mixing the cool air having passed through cool air passage 6 and the warm air having passed through passage 7 for heating. The desired temperature of conditioned air can be obtained by mixing the cool air from cool air passage 6 and the warm air from passage 7 for heating at the above-mentioned air mixing chamber 13.

A link mechanism 14 for operating sliding door 12 is provided at a position between cool air passage 6 and air mixing chamber 13 in the space defined in case 3. Link mechanism 14 also adjusts the flowing directions of the cool and warm air respectively flowing through cool air passage 6 and passage 7 for heating. The detail of link mechanism 14 will be described later in relation to sliding door 12.

In case 3, at an air downstream side of air mixing chamber 13, there are formed two branched air passages 15 and 16. Passage 15 extends upward as illustrated in FIG. 1. At an air downstream side of passage 15, there are provided a face air outlet passage 17 connected to a face air outlet (not shown in figures) for blowing the conditioned air toward the upper half of the body of a passenger in the passenger compartment and a defroster air outlet passage 18 connected to a defroster air outlet (not shown in figures) for blowing the conditioned air toward the inside surface of the windshield glass of the vehicle.

On the other hand, other passage 16 extends downward and is connected at its downstream end to a foot air outlet 19 for blowing the conditioned air toward the lower half of the body of the passenger.

At a branched portion between two passages 15 and 16, a first switching door 20a is disposed to select a flowing direction of the air conditioned in case 3 toward passage 15 or toward passage 16. When first switching door 20a is in a rotating position shown by "a" in FIG. 1, the whole conditioned air is sent to passage 15, whereas first switching door 20a is in another rotational position shown by "b" in FIG. 1, the whole conditioned air is sent to passage 16 and blown from foot air outlet 19.

Further, a second switching door 20b is provided just downstream of passage 15, so as to select whether the conditioned air sent to passage 15 by means of door 20 is to be supplied to face air outlet passage 17 or is to be supplied to defroster air outlet passage 18. More specifically, when first switching door 20a is in a rotating position "a" in FIG. 1 and second switching door 20b is in a rotating position "c" in FIG. 1, the conditioned air is supplied to the side of defroster air outlet passage 18. Conversely, when first switching door 20a is in the rotating position "a" in FIG. 1 and second switching door 20b is in a rotating position shown by "d" in FIG. 1, the conditioned air is supplied to the side of face air outlet passage 17.

The plane P where the aforementioned opening 8 for cool air and opening 9 for heating are open is formed with an inclination at a determined angle σ to a vertical line. Plane P is inclined with its upper side being closer to evaporator 4.

Accordingly, sliding door 12 slides in the vertical direction with its upper side being inclined toward evaporator 4. At this point, the angle of the inclination σ of plane P and sliding door 12 is set within a range from 5 to 30 degree in consideration of a later described drainage of condensed water, limited space for installing sliding door 12 or the like.

In case 3 of air conditioning unit 1, at a lower portion of evaporator 4, an discharge opening 3a is integrally formed for draining off the condensed water produced at evaporator 4. At a bottom of the case, a lower portion of sliding door 12, an inclined plane 3b inclined toward discharge opening 3a is provided.

Next, the above-mentioned sliding door 12 and link mechanism 14 will be described in detail.

Figure 2:
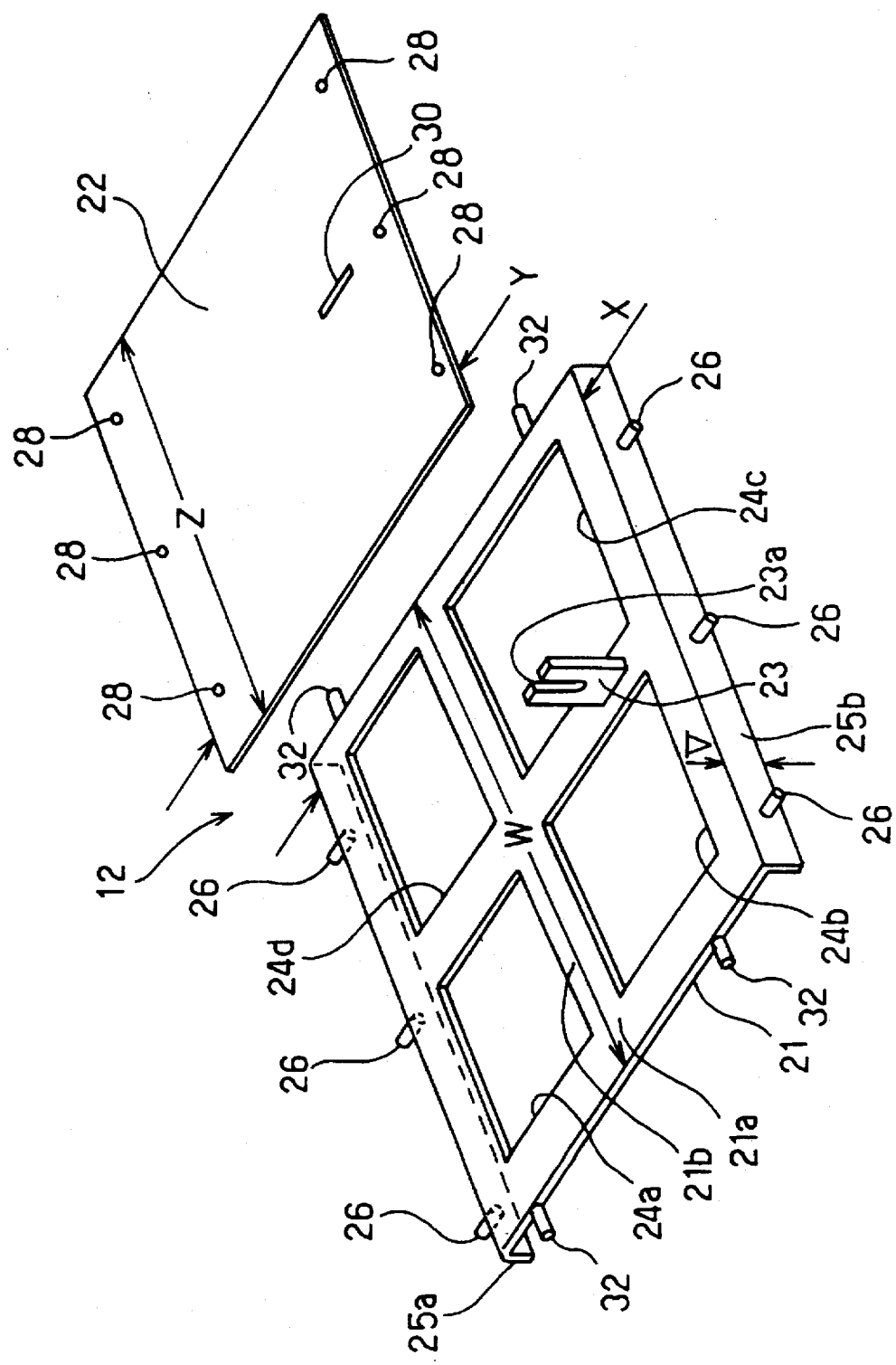
FIG. 2 is an exploded perspective view of a supporting member and a film member of a sliding door in FIG. 1.
Figure 3:
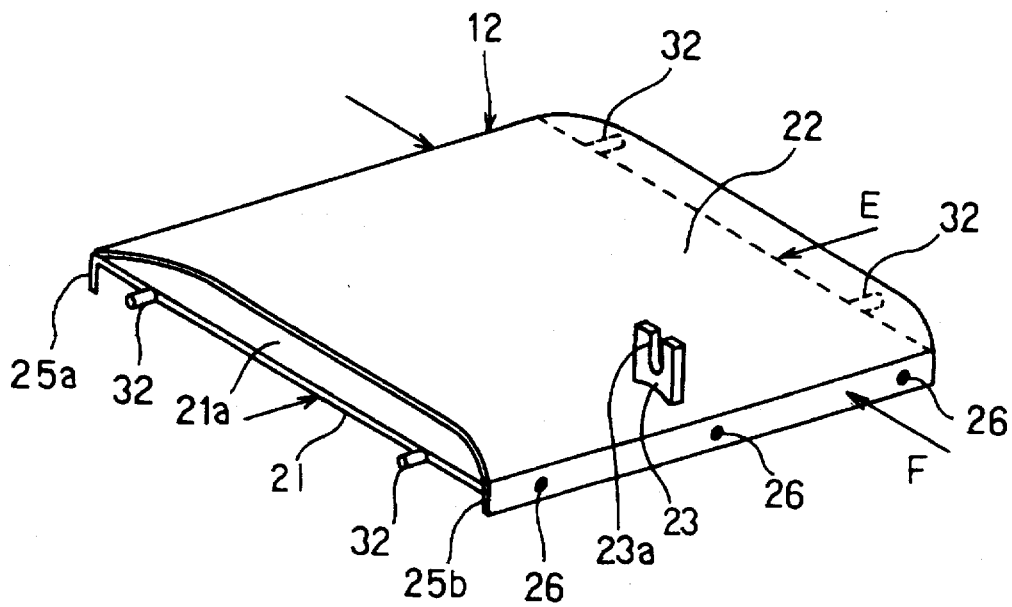
FIG. 3 is a perspective view illustrating a condition where the supporting member and the film member are installed in FIG. 2.
Figure 4:
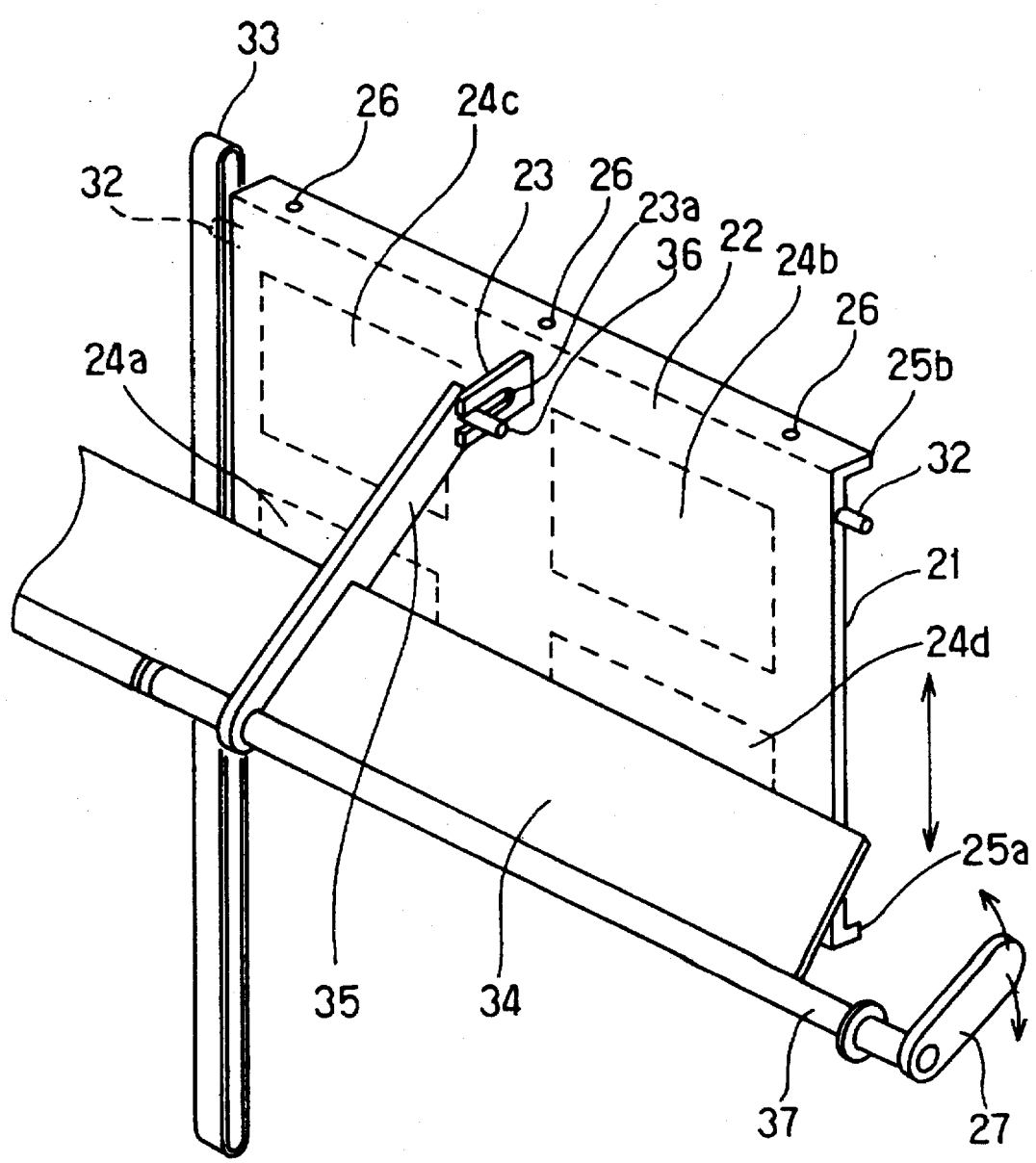
FIG. 4 is a perspective view illustrating a condition a sliding door is installed and maintained in a case.

FIG. 2 shows an exploded perspective view of sliding door 12. FIG. 3 is a perspective view illustrating sliding door 12 in an assembled condition. FIG. 4 is a perspective view of sliding door 12 mounted within case 3.

Sliding door 12 includes supporting member 21 and a film member 22 disposed so as to cover one flat portion 21a on the air downstream side of supporting member 21.

Supporting member 21 is made of resin material, such as polypropylene, with its outer shape formed in a substantially rectangular configuration. Since supporting member 21 is formed with four rectangular penetration holes (openings) 24a, 24b, 24c and 24d, supporting member 21 is configured like a lattice-shaped framework having a cross-shaped supporting portions 21b.

Supporting member 21 is integrally formed with mounting portions 25a and 25b bent substantially perpendicularly from flat portion 21a at the opposite ends (at the front end and the rear end as viewed in FIG. 2) over the entire length thereof. The outer surface of each of mounting portions 25a and 25b is integrally formed with a plurality (three in the drawing) of columnar projections 26 arranged at equal intervals. These mounting portions 25a and 25b are, as described later, provided to mount film member 22 on supporting member 21. As shown in FIGS. 1 and 4, mounting portions 25a and 25b are respectively formed upper and lower ends of sliding door 12.

On the other hand, the laterally opposite end surfaces of supporting member 21 as illustrated in FIG. 2 are integrally formed with a plurality (two for each end surface) of columnar holding portions 32 projecting sidewards from the end surfaces for movably holding supporting member within case 3. Furthermore, on upper surface of a supporting portion 21b of supporting member 21 (the surface facing to cool air passage 6 in FIG. 6), a lever member 23 having a U-shaped recess 23a is formed. As shown in FIG. 1, lever member 23 is formed so as to project from one flat portion 21a on the air downstream side of supporting member 21 into cool air passage 6.

Film member 22 is preferably formed of a resin material having flexibility, but no air permeability, and having a small frictional resistance. Particularly, film member 22 is formed of a resin film in a substantially rectangle configuration formed by polyethylene terephthalate having a thickness of 75 m, for example, and has a substantially rectangular shape.

With regard to the size of film member 22, a width Z of film member 22 is equal to a width W of supporting member 21. On the other hand, a height Y film member 22 is set larger by a predetermined length than the total of a height X of supporting member 21 and total width of mounting portions 25a and 25b (twice as long as the width "V" shown in FIG. 2).

At each longitudinal end portion of film member 22 include a plurality of mounting holes 28 arranged at equal intervals which are the same as the intervals of plurality of projections 26 formed at each longitudinal end of supporting member 21. In addition, film member 22 includes an insertion hole 30 into which the above-mentioned lever member 23 of supporting member is inserted.

In installing film member 22 in supporting member 21, three mounting holes 28 arranged at equal intervals at one end portion of film member 22, are engaged with (or loosely fitted into) projections 26 at one end of supporting member 21. Thereafter, lever member 23 of supporting member 21 is inserted into insertion hole 30, the other three mounting holes 28 at the other end of film member 22 are engaged (or loosely fitted) with other three projections 26 at the other end of supporting member 21.

Thereafter, all projections 26 are melted by using a heating device (not shown), for example, to thereby thermally bond film member 22 to mounting portions 25a and 25b of supporting member 21. Thus, film member 22 is fixed to supporting member 21. FIG. 3 shows the state after film member 22 is fixed to supporting member 21.

As mentioned above, a width Z of film member 22 is so set as to satisfy the relation of Z=W. Therefore, as shown in FIG. 3, the lateral width (the size shown by "E" in FIG. 3) of film member 22 is equal to that of supporting member 21, and the two members 21 and 22 are just overlapped each other. On the other hand, the longitudinal height (the size shown by "F" in FIG. 3) of film member 22 is larger than that of supporting member 21. Accordingly, film member 22 fixed to supporting member 21 is bent so that space is provided between plane portion 21a of supporting member 21 and film member 22.

Next, a mounting structure of supporting member 21 and film member 22 within case 3 will now be briefly described.

Resin case 3 as illustrated in FIG. 1 is configured by integrally connecting two divided case bodies on the front side and the back side of the sheet of FIG. 1 by means of metal clips, screws or the like. As shown in FIG. 4, a guide groove 33 having a sectionally elongated shape is formed on an inner wall of each case body of case 3 so as to extend in the vertical direction of case 3. Although only single guide groove 33 disposed behind the sheet in FIG. 1 is illustrated in FIG. 4, two confronting guide grooves 33 are provided at opposed positions on the inner walls of the two divided case bodies of case 3.

The extending direction of guide groove 33 is set to be substantially perpendicular to the airflow in case 3. However, since the extending direction of guide groove 33 needs to be set in parallel with plane P where opening 8 for cool air and opening 9 for heating are open, guide groove 33 is formed so as to be inclined to evaporator 4 with the tilt angle of σ as well as plane P. Further, each guide groove 33 is formed at a position just upstream opening 8 for cool air and opening 9 for heating in the vicinity of these openings 8 and 9.

Holding portions 32 of supporting member 21 at its one lateral end are inserted into guide groove 33 of one case body, and holding portions 32 of supporting member 21 at the other lateral end are similarly inserted into guide groove 33 of the other case body. Then, supporting member 21 is installed in case 3 in such a manner as to be held between two case bodies, and is supported slidably along guide groove 33.

In this condition where supporting member 21 is installed, flat portion 21a of supporting member 21 extends in a direction substantially perpendicular to the direction of air flow in case 3 (i.e., in a direction across the air flow), and supporting member 21 is movable along guide groove 33, supporting member 21 is constantly movable in the extending direction of guide groove 33. In addition, as shown in FIG. 4, mounting portions 25a and 25b are located at each ends of supporting member 21 with respect to the moving direction thereof.

Next, the aforementioned link mechanism 14 will be described in detail with reference to FIG. 4.

Link mechanism 14 includes a driving shaft 37 pivotably supported at each ends to case 3. Driving shaft 37, made of resin material such as polypropylene, is provided as to extend horizontally (in the lateral direction of the vehicle) at air mixing chamber 13 in case 3. Driving shaft 37 is integrally formed with an air guide plate 34 for adjusting the direction of air flow at air mixing chamber in case 3, and formed with a lever member 35. Lever member 35, with its one end connected to driving shaft 37, extends from the connected portion with driving shaft 37 toward lever member 23 of supporting member 21. The other end of lever member 35 is engaged with recess 23a of lever member 23 of supporting member 21.

One end of driving shaft 37 (at the side which is not shown in FIG. 4) is pivotably supported to the wall surface of case 3 so as not to be projected outside of case 3, while the other end of driving shaft 37 is projected outside of case 3 and is connected to a driving lever 27 as driving means for driving shaft 37.

The above-mentioned air guide plate 34 is a rectangular plate-like member elongated along the axial direction of driving shaft 37. Air guide plate 34 is rotated together with driving shaft 37 so as to change its rotational position.

Lever member 35 is formed at a substantially central position in the axial direction of driving shaft 37. The other end of lever member 35 is integrally formed with a columnar engaging portion 36. Engaging portion 36 is pivotably engaged with recess 23a of lever member 23 of supporting member 21.

In this way, air guide plate 34 and lever member 35 are rotated together about the axis of driving shaft 37 as the rotation of driving shaft 37. Accordingly, the position of engaging portion 36 of lever member 35 moves vertically as viewed in FIG. 4. This vertical movement of engaging portion 36 is transmitted via lever member 23 to supporting member 21, thereby moving supporting member 21 along guide groove 33 in the vertical direction as viewed in FIG. 4 (in the direction substantially perpendicular to the direction of air flow in case 3).

A driving mechanism for driving lever 27 may be a conventional one which rotates driving lever 27 by transmitting manual operating force applied to a manual operating lever (an operating lever for adjusting temperature) in an air-conditioning control panel disposed in the instrument panel in a passenger compartment via a control cable to driving lever 27. An actuator, such as a servomotor, which is automatically controlled by a control unit for an air-conditioner may be used for rotating driving lever 27.

An operation of the present embodiment mentioned above will now be described. Firstly, an operation in a maximum hot mode (maximum heating operation) as shown in FIG. 5 will be described.

Figure 5:
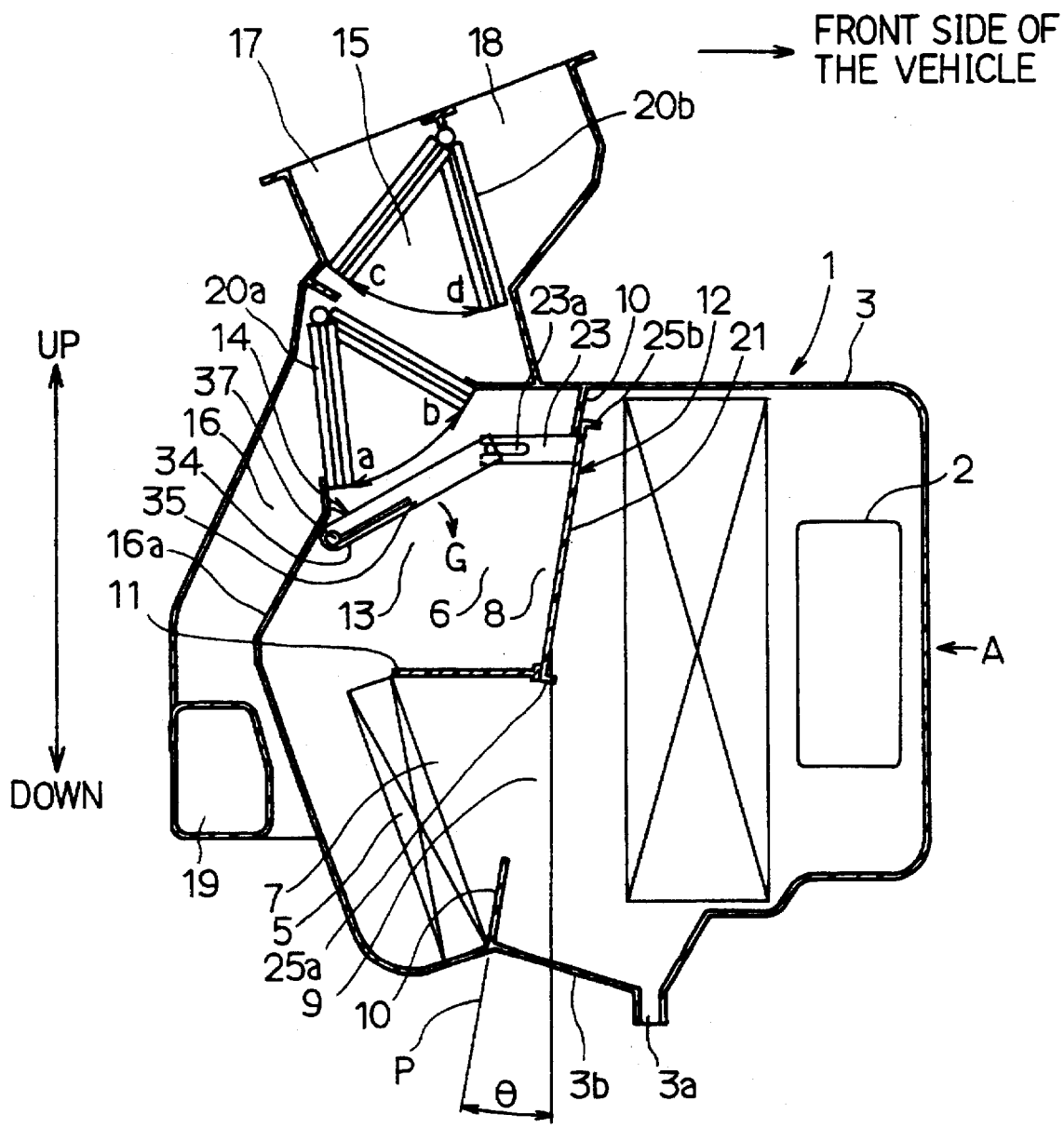
FIG. 5 is a cross-sectional view illustrating a general construction of the first embodiment of the present invention in a maximum hot mode.

In the operational condition shown in FIG. 5, supporting member 21 and film member 22 are in the uppermost operational position. In this operational condition, opening 9 for heating is fully open and opening 8 for cool air is fully closed. Consequently, the cool air having passed through evaporator 4 is wholly sent to heater core 5. The shapes of film member 22 in this condition are schematically shown in FIGS. 6 and 7.

Figure 6:
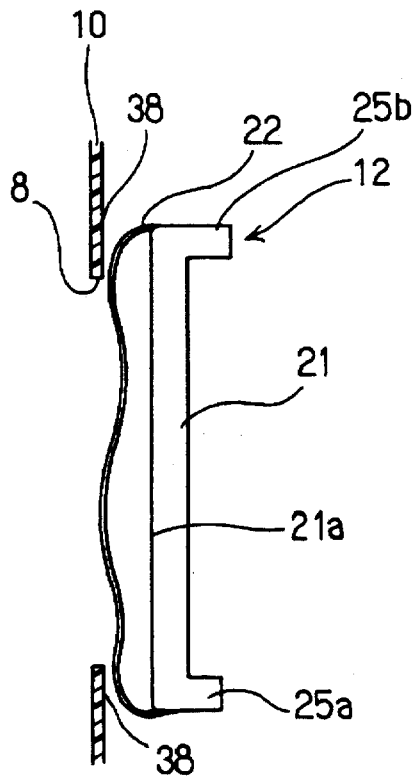
FIG. 6 is a partial structural view illustrating the condition of the film member when a blower is not operated.
Figure 7:
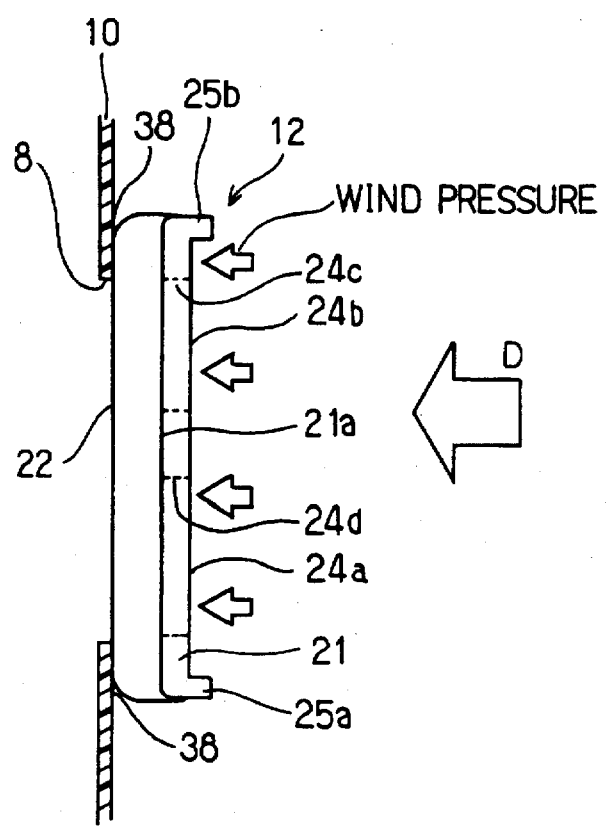
FIG. 7 is an another partial structural view illustrating the condition of the film member when the blower is operated.

FIG. 6 shows the shape of film member 22 when the blower is inoperative, and FIG. 7 shows the shape of film member 22 when the blower is operative.

When the blower is not operated, film member 22 maintains its natural shape as shown in FIG. 6, so that there is defined a slight gap between a peripheral portion 38 of opening 8 for cool air and film member 22. To the contrary, when the blower is operated, the air having passed through evaporator 4 (as shown by an arrow "D" in FIG. 7) passes through holes 24a, 24b, 24c and 24d of supporting member 21 to apply pressure on inner surface of film member 22 as shown in FIG. 7. Accordingly, film member 22 is flexed so as to be expanded leftward as viewed in FIG. 7 by the above wind pressure, the entire periphery of film member 22 comes into pressure contact with peripheral portion 38 of opening 8 for cool air.

As a result, opening 8 for cool air is firmly closed by film member 22, thus improving the sealing effect in the closed condition.

Therefore, there is no possibility that the air leaks from opening 8 for cool air in the maximum hot mode, and the cool air having passed through evaporator 4 can be wholly introduced from opening 9 for heating into passage 7 for heating.

Further, in the maximum hot mode, air guide plate 34 of link mechanism 14 has an operational position such that the opening area of the outlet of passage 7 for heating is maximized as shown in FIG. 5.

Next, an operation in an air mixing mode (intermediate temperature control operation) where the cool air having passed through evaporator 4 is sent to both cool air passage 6 and passage 7 for heating by means of sliding door 12 will be described with reference to FIG. 8.

Figure 8:
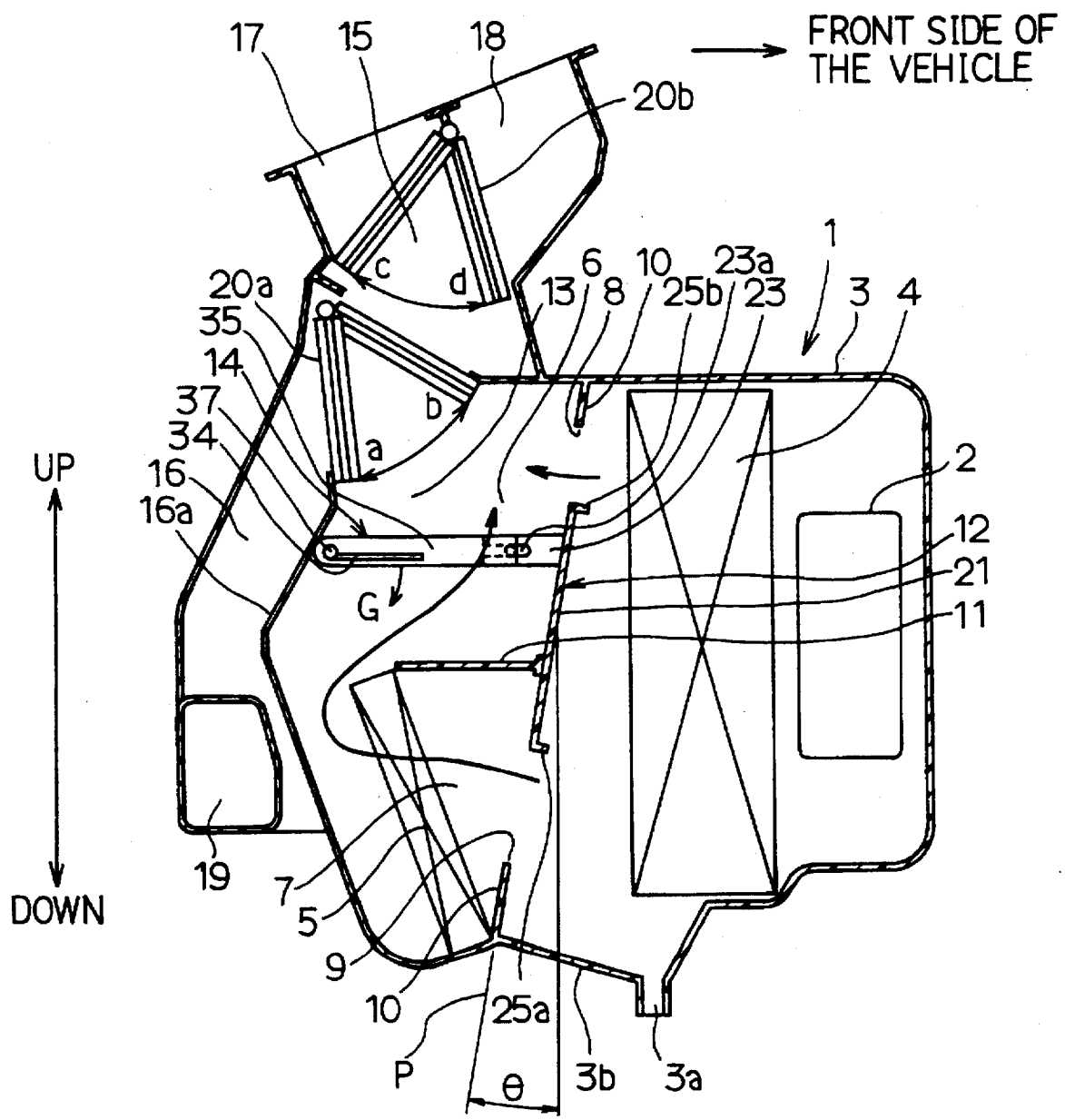
FIG. 8 is a cross-sectional view illustrating a general construction of the first embodiment of the present invention in an air mixing mode.

In the air mixing mode as shown in FIG. 8, supporting member 21 and film member 22 are located at a substantially vertically intermediate position in case 3 to adjust the ratio of opening area between opening 8 for cool air and opening 9 for heating and mix the air having passed through opening 8 for cool air with the air having passed through opening 9 for heating, thereby obtaining a desired temperature of conditioned air.

At this point, if the air introduced from opening 8 for cool air leaks from between partition 11 and film member 22 and enters passage 7 for heating, there may be a problem that a desired air mixing ratio cannot be obtained. Conversely, if the air introduced from opening 9 for heating leaks from between partition 11 and film member 22 and enters cool air passage 6, there may be a problem that a desired mixing ratio cannot also be obtained.

In this embodiment, however, the air having passed through evaporator 4 blows against film member 22 through holes 24a, 24b, 24c and 24d, thereby flexing film member 22 so as to expand it toward partition 11. Accordingly, film member 22 is brought into pressure contact with the end surface of partition 11 by the above air pressure, thus firmly preventing the occurrence of the above problems.

Accordingly, the ratio in opening area between cool air passage 6 and passage 7 for heating can be adjusted by film member 22 to thereby obtain a desired temperature of conditioned air.

Further, when the maximum hot mode is shifted to the air mixing mode, air guide plate 34 of link mechanism 14 is rotated in the direction of the arrow "G" from the condition in FIG. 5 to the condition shown in FIG. 8. Accordingly, the opening area of passage 7 for heating at its outlet is reduced by air guide plate 34, and a portion of passage 7 for heating in the vicinity of a partition 16a between cool air passage 16 and passage 7 for heating is blocked by air guide plate 34. As a result, the air having passed through passage 7 for heating is changed in flow direction by air guide plate 34 to flow between film member 22 and air guide plate 34 (see FIG. 8) into cool air passage 6.

Accordingly, the warm air passed through between film member 22 and air guide plate 34 comes into collision with the cool air flowing in cool air passage 6 in a direction perpendicular to or slightly opposite to the flow direction of the cool air, thereby facilitating the mixing of the cool air and the warm air and allowing the cool air and the warm air to be uniformly mixed in air mixing chamber 13.

Next, an operation in a maximum cool mode (maximum cooling operation) will be described with reference to FIG. 1.

In the maximum cool mode shown in FIG. 1, supporting member 21 and film member 22 are in the lowermost operational position where opening 9 for heating air is fully closed and opening 8 for cool air is fully open. Accordingly, the air having passed through evaporator 4 is wholly sent to cool air passage 6.

The condition of film member 22 in the maximum cool mode is similar to that in the maximum hot mode mentioned above, and the description thereof will therefore be omitted herein.

When the air mixing mode is shifted to the maximum cool mode, air guide plate 34 of link mechanism 14 is further rotated in the direction of the arrow "G" from the rotational position shown in FIG. 8 to the rotational position shown in FIG. 1 where the opening area of passage 7 for heating at its outlet is minimized. Although the air having passed through evaporator 4 does not flow passage 7 for heating in the maximum cool mode, heat radiation from heater core 5 (heat radiation by natural convection due to an engine cooling water constantly circulating in heater core 5) causes a slight increase in temperature of the air in passage for heating air, so that the warm air in passage 7 for heating air flows into air mixing chamber 13 as shown by the arrow "K" in FIG. 1 and is mixed with the cool air, thus deteriorating the cooling performance.

In this embodiment, however, air guide plate 34 in the maximum cool mode has the operational position shown in FIG. 1 to minimize the opening area of the outlet of passage 7 for heating, and also serves as a block wall for suppressing that the warm air due to heat radiation from heater core 5 may flow into air mixing chamber 13. Thus, the deterioration in cooling performance due to heat radiation from heater core 5 can be minimized.

Further, air guide plate 34 is inclined upward on the left side thereof as viewed in FIG. 1 (i.e., the left side of air guide plate 34 is raised to the downstream side of air mixing chamber 13). Accordingly, air guide plate 34 also serves as a block for blocking the flow of the air having passed through cool air passage 6 into passage 7 for heating air and a guide for guiding the cool air to either passage 15 or 16.

In such an operation of the above-mentioned air conditioning unit, a refrigerating cycle is operated, and when the blown air is cooled at evaporator 4, the moisture in the blown air is condensed by the cooling operation, so that the condensed water is prone to move toward the air downstream along with the blown air flow. Particularly, since sliding door 12 slides in the direction crossing air passage 7 to heater core 5 and cool air passage 6, the space for installing sliding door 12 can be greatly reduced as compared with the space for installing the conventional rotary door, thereby minimizing the gap between evaporator 4 and heater core 5.

Figure 9:
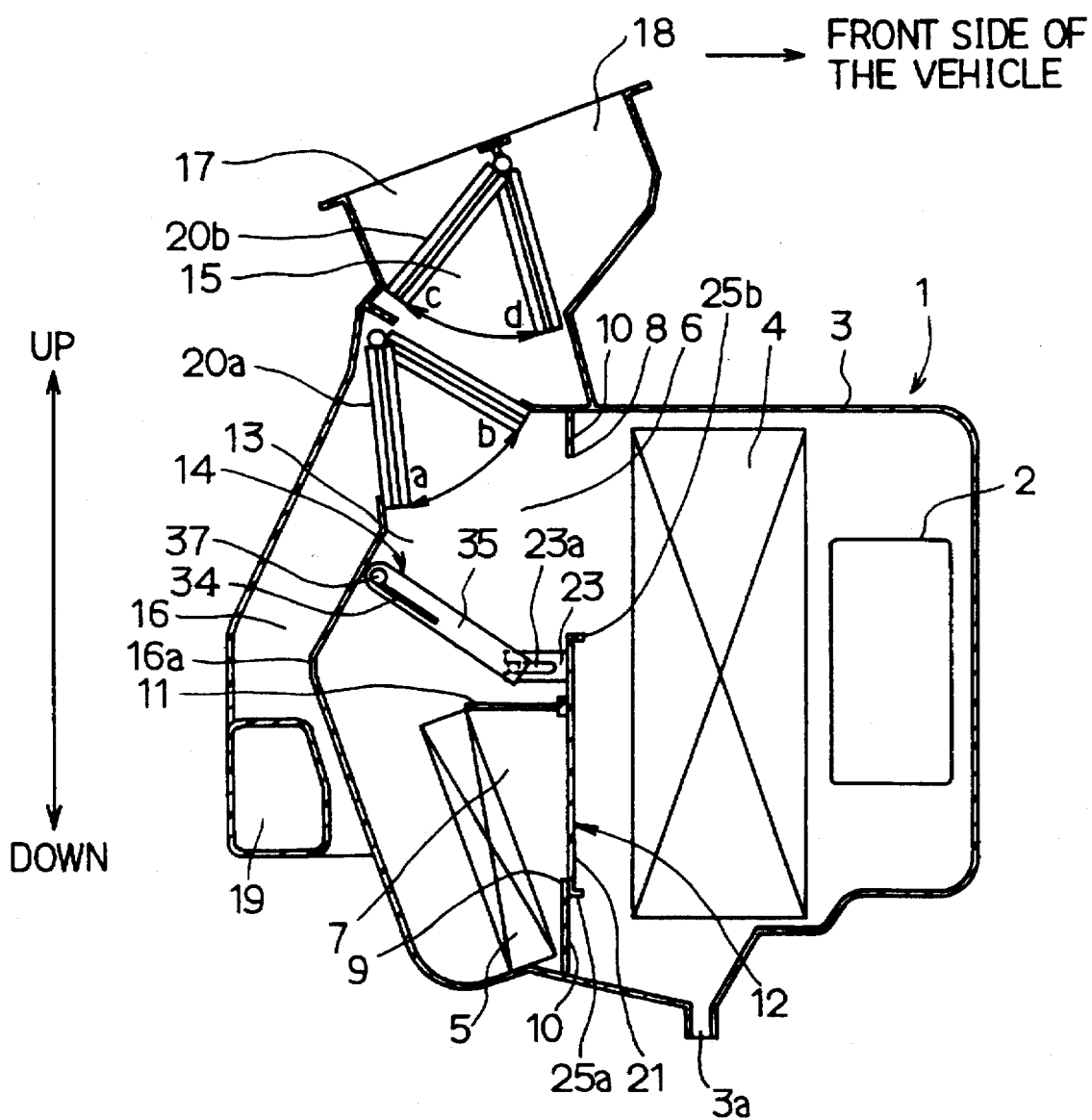
FIG. 9 is a cross-sectional view illustrating a general construction of a second embodiment of the present invention in a maximum cool mode.
Figure 10:
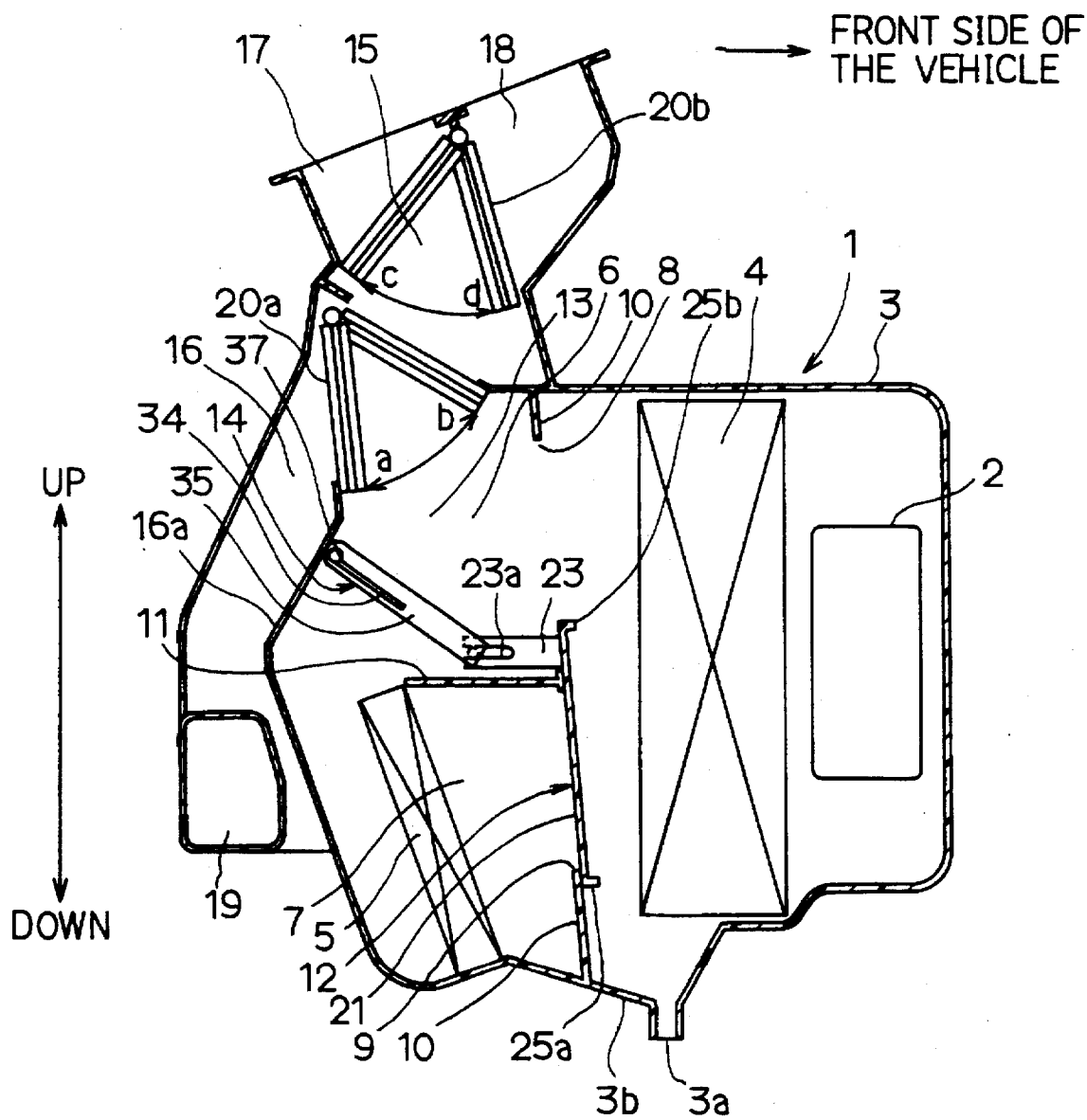
FIG. 10 is a cross-sectional view illustrating a general construction of a third embodiment of the present invention in a maximum cooling mode.

As a result, in the layout where sliding door 12 is disposed vertically as shown in FIG. 9 and the layout where sliding door 12 is disposed with an inclination opposite to evaporator 4 (toward the air downstream side) as shown in FIG. 10, there may be a phenomenon that the condensed water produced at evaporator 4 sticks to sliding door 12 and heater core 5 without dropping off.

Therefore, according to the present embodiment as described above, plane P where opening 8 for cool air and opening for heating 9 are open is formed with its upper side inclined at the predetermined angle σ toward evaporator 4. Sliding door 12 slides in the vertical direction while the upper side is inclined toward evaporator, thereby the condensed water, which is prone to move to the air downstream side along with the blown air flow from evaporator 4, is smoothly guided with the blown air along the inclination of sliding door 12.

The condensed water dropped along the inclination of sliding door 12 to the bottom portion of sliding door 12 is guided to discharge opening via inclined surface 3b formed at the bottom of case 3 and finally drained from discharge opening 3a to the outside.

As described above, plate-like supporting member 21 and film member 22 are movable in a direction parallel to the extending direction of the plane of supporting member 21 and substantially perpendicular to the air flow direction in case 3, thereby reducing the operation space for supporting member 21 and film member 22. That is, as compared with the conventional rotary air mixing door, the width of sliding door 12 in the lateral direction as viewed in FIG. 1 (in the longitudinal direction of the vehicle) can be greatly shortened.

Further, since link mechanism 14 for operating supporting member 21 is located in the space leading from cool air passage 6 to air mixing chamber 13 in case 3, the clearance "X" (FIG. 1) between supporting member 21 and evaporator 4 can be minimized as required. Further, since link mechanism 14 is incorporated in case 3, it is not necessary to secure a space for installing link mechanism 14 outside case 3.

As a result, the overall size of the air conditioner for the vehicle can be greatly reduced.

Further, since film member 22 is flexed by the wind pressure to come into pressure contact with peripheral portion 38 of opening 8 or 9 and partition 11, opening 8 or 9 can be reliably sealed by film member 22. Further, since the sealing effect of film member 22 is obtained by the wind pressure, a force for operating supporting member 21 can be greatly reduced as compared with the case where a packing mounted on supporting member 21 slides in pressure contact with peripheral portion 38 and partition 11. Still further, since supporting member 21 and film member 22 are moved in a direction substantially perpendicular to the flow direction of air in case 3, there is no possibility of an increase in operating force applied to sliding door 12 irrespective of the direction of movement of sliding door 12.

Further, the condensed water is satisfactorily drained along the inclination of sliding door 12.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioner for a vehicle having a passenger compartment, said air conditioner comprising:

a case for introducing conditioned air to said passenger compartment;

a cooler disposed in said case, for cooling air passing therethrough;

a heater, disposed on a downstream side of said cooler in said case, for heating air passing therethrough;

a warm air passage formed at a downstream side of said heater in said case, through which said heated air passes, formed at a lower side in said case;

a cool air passage formed in parallel with said warm air passage at a downstream side of said cooler in said case and at an upper side in said case, through which said cooled air passes;

a cool air/warm air mixing chamber formed at a downstream side of said cool air passage and said warm air passage in said case, for mixing said cool air from said cool air passage and warm air from said warm air passage;

an air outlet passage formed at a downstream side of said cool air/warm air mixing chamber, for introducing air from said cool air/warm air mixing chamber into said passenger compartment; and a sliding door disposed between said cooler and said heater and being slidable in a crossing direction which is proximate to and generally parallel to inlets of both said cool air passage and said warm air passage, for controlling a ratio between a volume of air flowing to said warm air passage and a volume of air flowing to said cool air passage; wherein, said sliding door slides vertically in such a manner that an upper side portion of said sliding door inclines toward said cooler.

2. An air conditioner according to claim 1, wherein, said sliding door includes:

a support member having an opening;

a film member provided on a downstream side surface of said support member so as to be movable together with said support member, said film member having flexibility; and a guide member for guiding said support member so as to move in said crossing direction; wherein, said sliding door slides vertically while said upper portion of said sliding door inclines toward said cooler.

3. An air conditioner according to claim 1, wherein, said case further includes:

a discharge opening at a lower portion thereof to drain condensed water, and an inclined surface at a bottom surface under said sliding door, said inclined surface being inclined toward said discharge opening.

4. An air conditioner according to claim 1, wherein, said sliding door slides on a plane (P) which inclines from a perpendicular surface with respect to the flowing directions of cool air and warm air.

5. An air conditioner according to claim 1, wherein, said cool air passage and said warm air passage have openings which are open on a same plane, said sliding door slides substantially in parallel with said same plane.

6. An air conditioner for a vehicle having a passenger compartment, said air conditioner comprising:

a case for introducing conditioned air to said passenger compartment;

a cooler disposed in said case, for cooling air passing therethrough;

a heater, disposed on a downstream side of said cooler in said case, for heating air passing therethrough;

a warm air passage formed at a downstream side of said heater in said case, through which warm air passes;

a cool air passage, through which said cooled air passes, formed in parallel with said warm passage and an upper side in said case;

a cool air/warm air mixing chamber formed at as downstream side of said cool air passage and said warm air passage, for mixing said cool air from said cool air passage and warm air from said warm air passage;

an air outlet passage formed at a downstream side of said cool air/warm air mixing chamber, for introducing air from said cool air/warm air mixing chamber into said passenger compartment;

and a sliding door positioned at an upstream side of said cool air passage and said warm air passage and being slidable in a crossing direction which is proximate to and generally parallel to inlets of both said cool air passage and said warm air passage, for controlling a ratio between a volume of air flowing to said warm air passage and a volume of air flowing to said cool air passage; wherein said sliding door slides vertically so as to incline with respect to the airflow direction in such a manner that an upper portion of said sliding door is located at the most air upstream side.

7. An air conditioner for a vehicle having a passenger compartment, said air conditioner comprising:

a case having an air passage for introducing conditioned air to said passenger compartment;

a cooler disposed in said case, for cooling air passing therethrough;

a heater, disposed on a downstream side of said cooler in said case, for heating air passing therethrough;

a warm air passage formed at a downstream side of said heater in said case, through which warm air passes, formed at a lower side in said case, a cool air passage, through which said cooled air passes, formed in parallel with said warm air passage at a downstream side of said cooler in said case and at an upper side in said case, a cool/warm air mixing chamber formed at a downstream side of said cool air passage and said warm air passage, for mixing said cool air from said cool air passage and warm air from said warm air passage, and an air outlet passage formed at a downstream side of said cool air/warm air mixing chamber, for introducing air from said cool air/warm air mixing chamber into said passenger compartment; and a sliding door positioned between said cooler and said heater and being slidable in a crossing direction which is proximate to and generally parallel to inlets of both said cool air passage and said warm air passage for controlling a ratio between a volume of air flowing to said warm air passage and a volume of air flowing to said cool air passage;

wherein said sliding door slides vertically in such a manner that an upper portion of said sliding door is closest to said cooler.

8. An air conditioner according to claim 1, further comprising a link mechanism for operating said sliding door disposed in a space leading from the cool air passage to the cool air/warm air mixing chamber.

* * * * *